US008639835B2

(12) United States Patent
Kotecha et al.

(10) Patent No.: US 8,639,835 B2
(45) Date of Patent: Jan. 28, 2014

(54) TCP WINDOW SIZE PERFORMANCE OPTIMIZATION IN WIRELESS NETWORKS

(75) Inventors: Lalit Ratilal Kotecha, San Ramon, CA (US); Raafat Edward Kamel, Little Falls, NJ (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 12/955,103

(22) Filed: Nov. 29, 2010

(65) Prior Publication Data
US 2012/0137019 A1    May 31, 2012

(51) Int. Cl.
*G06F 15/16*    (2006.01)
(52) U.S. Cl.
USPC ........... 709/233; 709/220; 709/250; 709/223; 709/246
(58) Field of Classification Search
USPC ............... 709/233, 220, 250, 223, 246
See application file for complete search history.

(56) References Cited

U.S. PATENT DOCUMENTS

| 6,754,228 | B1* | 6/2004 | Ludwig | 370/468 |
|---|---|---|---|---|
| 7,916,640 | B1* | 3/2011 | Bishara | 370/235 |
| 2005/0179607 | A1 | 8/2005 | Gorsuch et al. | |
| 2006/0056300 | A1* | 3/2006 | Tamura et al. | 370/235 |
| 2006/0268708 | A1* | 11/2006 | Speight et al. | 370/235 |
| 2007/0173303 | A1 | 7/2007 | Viorel et al. | |
| 2008/0025216 | A1* | 1/2008 | Singh et al. | 370/231 |
| 2010/0054123 | A1* | 3/2010 | Yong | 370/230 |
| 2010/0085887 | A1* | 4/2010 | Ray et al. | 370/252 |
| 2010/0311321 | A1 | 12/2010 | Norin | |
| 2010/0313232 | A1 | 12/2010 | Norin | |

OTHER PUBLICATIONS

Chang et al., Dynamic Computation of TCP Maximum Window Size for Directly Connections Hosts, Mar. 26, 2005.*

* cited by examiner

*Primary Examiner* — Thu Nguyen
*Assistant Examiner* — Lan-Dai T Truong

(57) ABSTRACT

A system may include user equipment. The user equipment may determine a group of first Transmission Control Protocol (TCP) window size values based on different information relating to a wireless network, and determine a second TCP window size value based on the group of first TCP window size values. The user equipment may further transmit data using a transmission window size corresponding to the second TCP window size value.

15 Claims, 7 Drawing Sheets

TCP WINDOW SIZE PERFORMANCE OPTIMIZATION IN WIRELESS NETWORKS

BACKGROUND INFORMATION

The Transmission Control Protocol (TCP) was originally designed for wired networks, but has subsequently been used for wireless networks. For wireless networks, throughput is a function of the window size parameter, which generally defines the number of bytes that can be sent at one time, and the Round Trip Time (RTT) for a packet. For example, maximum throughput may be equal to (MAX Window Size)/RTT. As wireless networks continue to offer larger peak data rates, a need for a larger TCP window size exists. However, a larger window size may result in wasted radio resources.

BRIEF DESCRIPTION OF THE DRAWINGS

FIGS. 4-7 are a flow chart of an example process for using an optimized TCP window size value for transmitting data.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Implementations described herein may provide systems and/or methods that optimize Transmission Control Protocol (TCP) performance in a wireless network. Optimizing the TCP performance may increase overall throughput in the wireless network.

Figure 1:
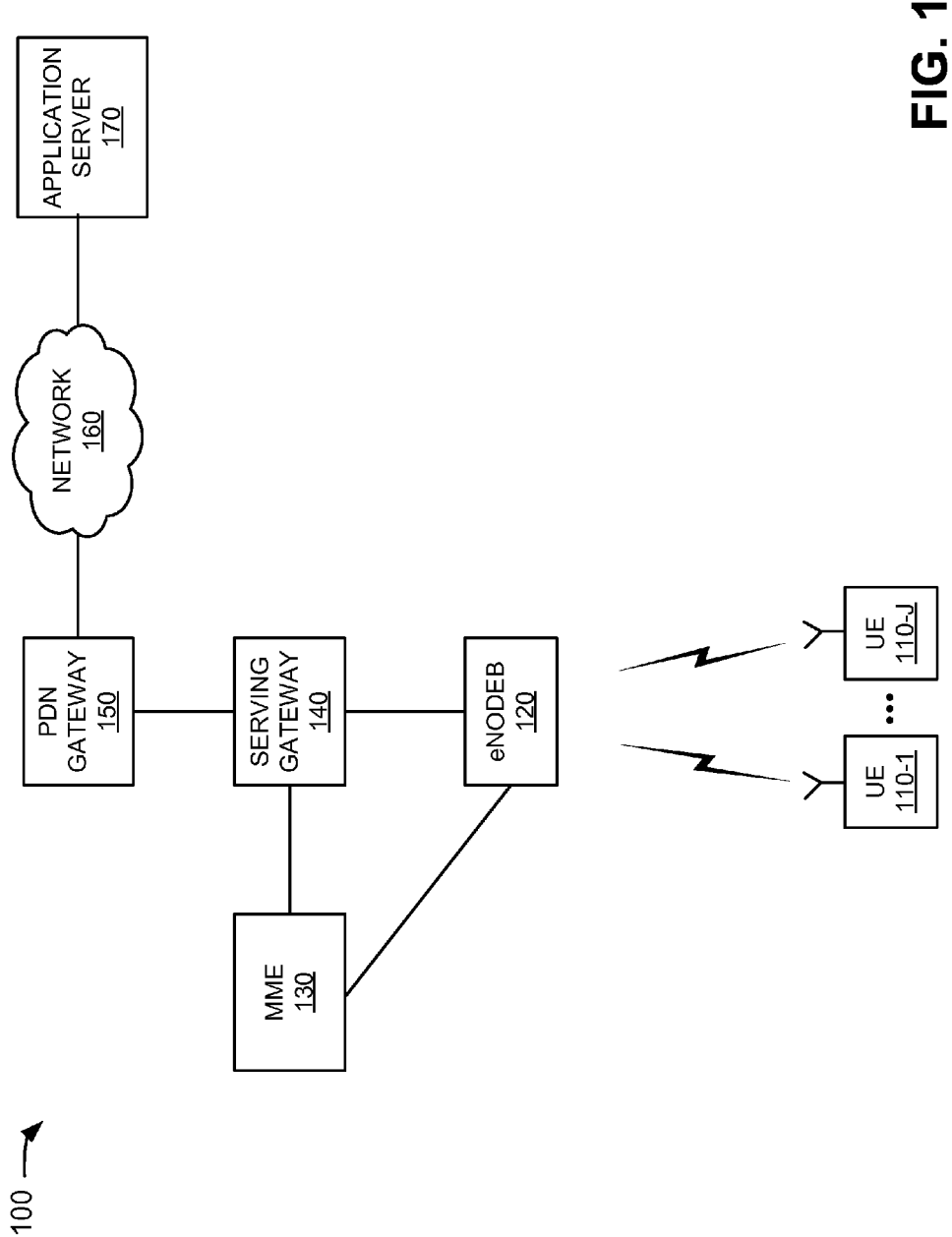
FIG. 1 is a diagram of an example network in which systems and methods described herein may be implemented.

FIG. 1 is a diagram of an example network 100 in which systems and methods described herein may be implemented. Network 100 may include a group of user equipment (UE) 110-1 through 110-J (J≥1) (referred to collectively, and in some instances individually, as "user equipment 110"), an evolved NodeB (eNodeB) 120, a mobility management entity 130, a serving gateway 140, a packet data network (PDN) gateway 150, a network 160, and an application server 170. eNodeB 120, mobility management entity 130, serving gateway 140, and PDN gateway 150 may, together, correspond to an Evolved Packet System (EPS) system.

User equipment 110 may include one or more devices or systems capable of sending/receiving data to/from the EPS system. User equipment 110 may include, for example, mobile or fixed wireless devices or systems, such as wireless telephones, personal digital assistants (PDAs), laptops, computer devices, set-top boxes, gaming systems, televisions, copiers, printers, etc.

eNodeB 120 may include one or more devices that receive voice and/or data from mobility management entity 130, serving gateway 140, and/or another device and transmit that voice and/or data to user equipment 110 via an air interface. eNodeB 120 may also include one or more devices that receive voice and/or data from user equipment 110 over an air interface and transmit that voice and/or data to mobility management entity 130, serving gateway 140, and/or another device (such as another user equipment 110).

Mobility management entity 130 may include one or more devices that manage mobility, user equipment 110 identities, and security parameters. Mobility management entity 130 may perform one or more of the following functions: non-access stratum (NAS) signaling; NAS signaling security; security control; inter-core network signaling for mobility between 3GPP access networks; idle mode user equipment 110 reachability; tracking area list management (for user equipment 110 in idle and active modes); handovers to and/or from network 100; roaming; traffic policing functions; authentication operations; bearer management functions; etc.

Serving gateway 140 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, serving gateway 140 may route and forward user data packets, may act as a mobility anchor for a user plane during inter-eNodeB handovers, and may act as an anchor for mobility between LTE and other 3GPP technologies. For idle state user equipment 110, serving gateway 140 may terminate a downlink (DL) data path and may trigger paging when down link data arrives for user equipment 110.

PDN gateway 150 may include one or more devices that act as a gateway for additional networks, such as network 160. In other words, PDN gateway 150 may provide connectivity from user equipment 110 to external packet data networks by being the point of exit and entry of traffic for user equipment 110. PDN gateway 150 may perform policy enforcement, packet filtering, and/or other services relating to the access of user equipment 110 to the external packet data network.

Network 160 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks.

Application server 170 may include one or more server devices that provide data to user equipment 110. In one implementation, application server 170 may communicate with user equipment 110 based on a TCP window size value provided by user equipment 110. Application server 170 may connect to network 160 via wired and/or wireless connections. For example, application server 170 may connect to network 160 via one or more networks, such as the Internet.

Although FIG. 1 shows example components of network 100, in other implementations, network 100 may include fewer components, different components, differently arranged components, or additional components than depicted in FIG. 1. Additionally, or alternatively, one or more components of network 100 may perform the tasks described as being performed by one or more other components of network 100.

Figure 2:
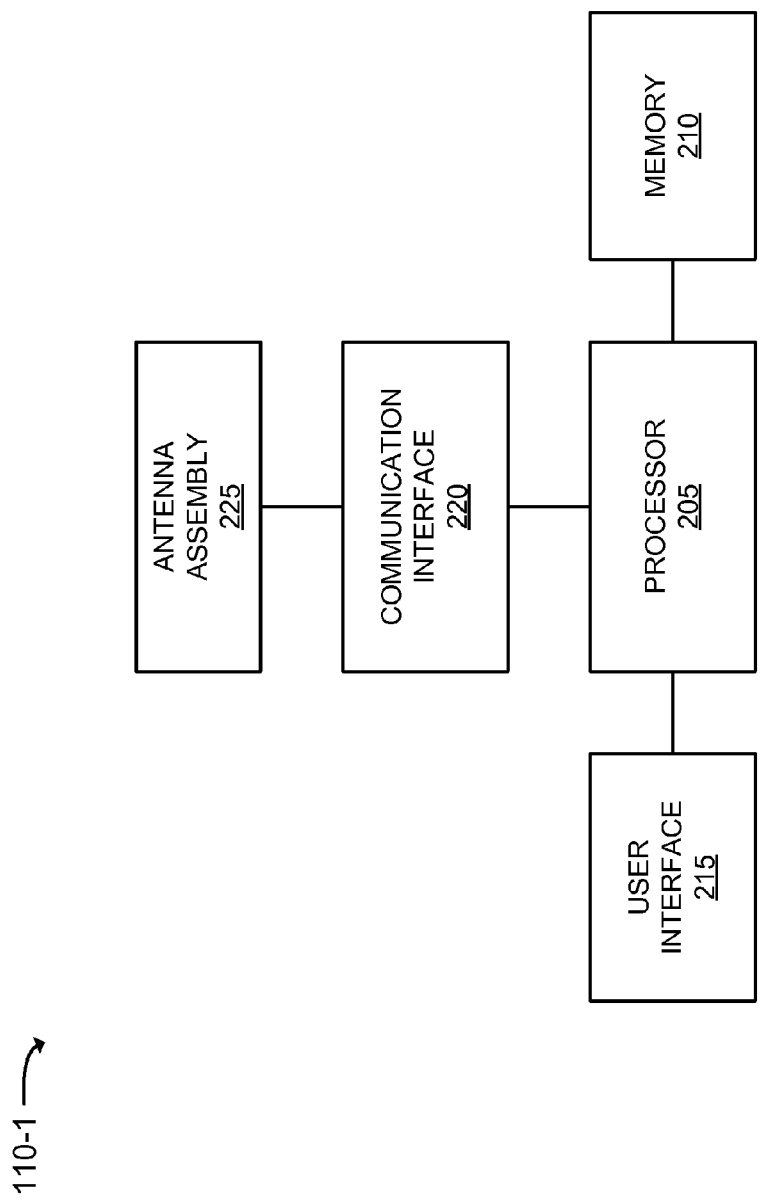
FIG. 2 is an example of components of the user equipment of FIG. 1 according to a first implementation.

FIG. 2 is an example of components of user equipment 110-1 according to a first implementation. User equipment 110-2 through 110-J may be similarly configured. As shown in FIG. 2, user equipment 110-1 may include a processor 205, a memory 210, a user interface 215, a communication interface 220, and/or an antenna assembly 225. Processor 205 may include one or more processors, microprocessors, application specific integrated circuits (ASICs), field programmable gate arrays (FPGAs), etc. Processor 205 may control operation of user equipment 110-1 and its components. Memory 210 may include a random access memory (RAM), a read-only memory (ROM), and/or another type of memory to store data and instructions that may be used by processor 205.

User interface 215 may include mechanisms for inputting information to user equipment 110-1 and/or for outputting information from user equipment 110-1. Examples of input and output mechanisms might include buttons (e.g., control buttons, keys of a keypad, a joystick, etc.) to permit data and control commands to be input into user equipment 110-1; a speaker to receive electrical signals and output audio signals; a microphone to receive audio signals and output electrical signals; a display to receive input (e.g., when the display is implemented as a touch screen) and/or output visual information (e.g., text input into user equipment 110-1); and/or a vibrator to cause user equipment 110-1 to vibrate.

Communication interface 220 may include, for example, a transmitter that may convert baseband signals from processor 205 to radio frequency (RF) signals and/or a receiver that may convert RF signals to baseband signals. Alternatively, communication interface 220 may include a transceiver to perform functions of both a transmitter and a receiver. Communication interface 220 may connect to antenna assembly 225 for transmission and/or reception of the RF signals. Antenna assembly 225 may include multiple antennas to transmit and/or receive RF signals over the air. Antenna assembly 225 may, for example, receive RF signals from communication interface 220 and transmit the RF signals over the air, and receive RF signals over the air and provide them to communication interface 220. In one implementation, for example, communication interface 220 may communicate with a network, such as network 100.

As will be described in detail below, user equipment 110-1 may perform certain operations in response to processor 205 executing software instructions of an application contained in a computer-readable medium, such as memory 210. A computer-readable medium may be defined as a non-transitory memory device. A memory device may include a space within a single physical memory device or spread across multiple physical memory devices.

The software instructions may be read into memory 210 from another computer-readable medium or from another device via communication interface 220. The software instructions contained in memory 210 may cause processor 205 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of user equipment 110-1, in other implementations, user equipment 110-1 may include fewer components, different components, differently arranged components, or additional components than depicted in FIG. 2. Additionally, or alternatively, one or more components of user equipment 110-1 may perform one or more of the tasks described as being performed by one or more other components of user equipment 110-1.

Figure 3:
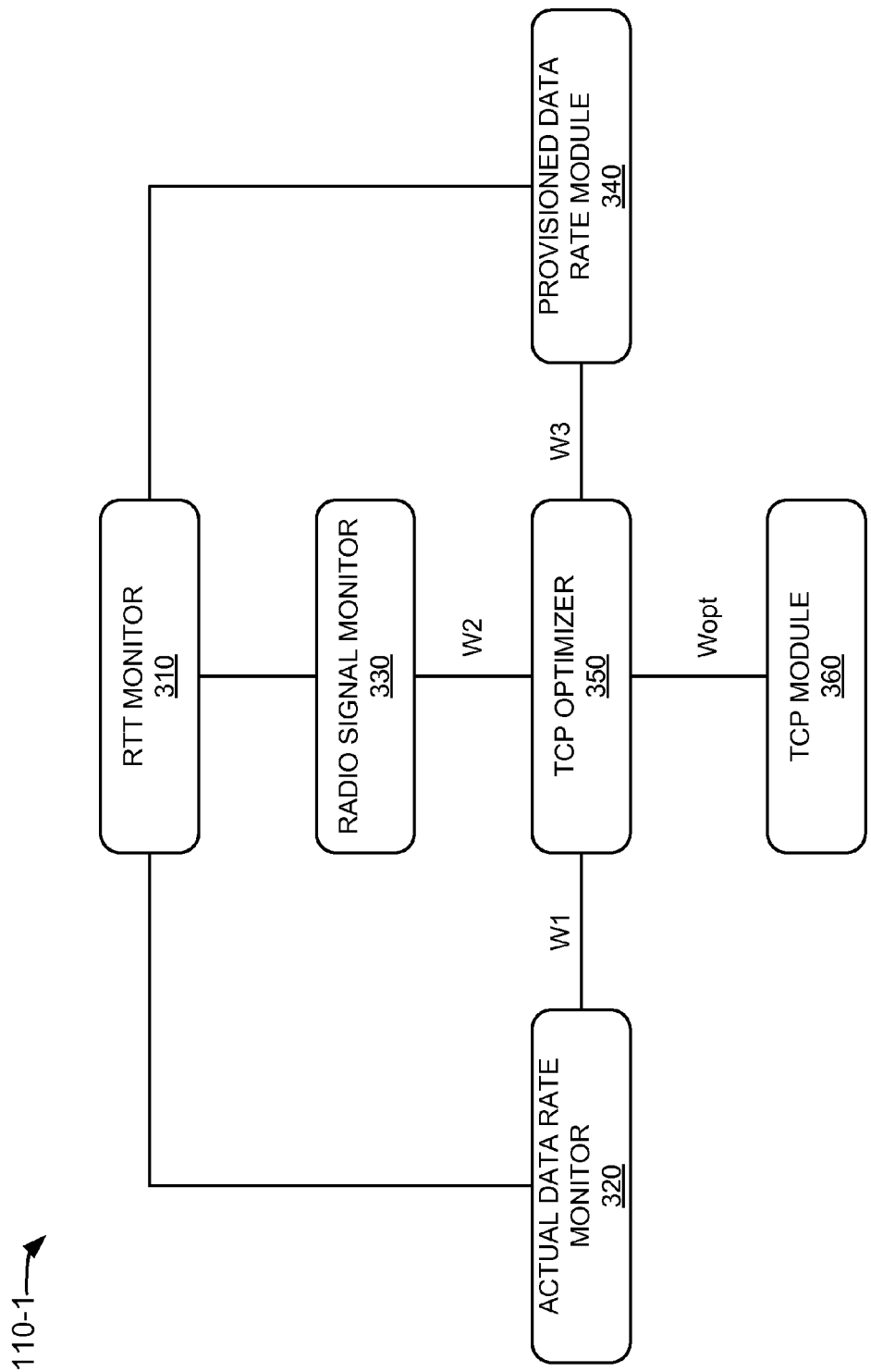
FIG. 3 is a diagram of example functional components of the user equipment of FIG. 1.

FIG. 3 is a diagram of example functional components of user equipment 110-1. User equipment 110-2 to 110-J may include similar functional components and may be similarly arranged. In one implementation, the functional components described in connection with FIG. 3 my be implemented via, for example, processor 205 executing instructions contained in memory 210. As shown, user equipment 110-1 may include an RTT monitor 310, an actual data rate monitor 320, a radio signal monitor 330, a provisioned data rate module 340, a TCP optimizer 350, and/or TCP module 360.

RTT monitor 310 may include one or more components that determine a current round trip time for the session (through the wireless network to which user equipment 110-1 is connected). For example, RTT monitor 310 may determine a current round trip time as the elapsed time between when a packet is sent to application server 170 and when a response to the packet is received. Thus, RTT monitor 310 may send a packet to, for example, application server 170 and measure the amount of time from transmission of the packet until an acknowledgement of the packet is received. RTT monitor 310 may set the current round trip time as this measured amount of time.

Actual data rate monitor 320 may include one or more components that determine an actual data rate for user equipment 110-1. For example, actual data rate monitor 320 may monitor actual received data for each time period of a certain number (N1) of time periods. The duration of the time periods and the number (N1) of time periods may be predetermined (e.g., user equipment 110-1 may be configured with this information) or received by user equipment 110-1 during equipment activation/provisioning. As one example, the length of the time period may be on the order of a few milliseconds to a second. Other time period lengths may alternatively be used. The number (N1) of time periods may be a smaller number, such as 5 or 10, or a larger number, such as 50 or more. In those situations where radio conditions are changing frequently (e.g., such as when user equipment 110-1 is a mobile wireless device), a smaller value for N1 may be used. On the other hand, in those situations where radio conditions are changing less frequently (e.g., such as when user equipment 110-1 is a fixed wireless device), a larger value of N1 may be used.

Actual data rate monitor 320 may determine a received data rate (d) for each time period (T) of the N1 number of time periods and determine an average received data rate over all N1 number of time periods. For example, actual data rate monitor 320 may determine an average data rate (D1) as follows:

$$D1=(d1+d2+\ldots+DN1)/N1, \tag{1}$$

where D1 may correspond to the average data rate, d may correspond to the determined data rate for a time period, and N1 may correspond to the number of time periods.

In addition, actual data rate monitor 320 may include one or more components that receive the round trip time from RTT monitor 310 and use the round trip time and average data rate to determine a TCP window size value. For example, actual data rate monitor 320 may determine a TCP window size value as follows:

$$W1=D1*RTT/m1, \tag{2}$$

where W1 may correspond to the TCP window size value, D1 may correspond to the average data rate calculated above with respect to equation (1), RTT may correspond to the monitored round trip time, and m1 may correspond to a multiplier that is observed and measured in high speed wireless networks for window scaling.

Typically, the maximum TCP window size (W) is calculated as W=Data Rate*Round Trip Time. However, the TCP window size (W) almost never reaches this theoretical maximum. Instead, the TCP window size is typically observed as 0.75 times the maximum TCP window size. In practice, m1 may include a value that is less than 1. The value for m1 may be hardcoded into user equipment 110-1 and/or may be calculated (or tuned) by user equipment 110-1 or another device. In one implementation, the value for m1 may be approximately in the range of about 0.75 to about 0.85. Other values and other ranges are possible. Regardless of the value of m1, user equipment 110-1 may adjust the m1 value based on network conditions. As one example, assume that the TCP window size value for user equipment 110-1 has been set to be 500 kilobytes. However, assume that user equipment 110-1 determines that the TCP window size is not going to exceed 350 kilobytes. User equipment 110-1 (e.g., actual data rate monitor 320) may set the m1 value to be 0.7 (i.e., 350 kilobytes/500 kilobytes). Over time, user equipment 110-1 may adjust that value up or down based on observed network conditions.

Actual data rate monitor 320 may recalculate the TCP window size value (W1) at periodic intervals (e.g., at the expiration of a timer). The duration of the intervals may, for example, correspond to T*N1. The duration of the interval may be configurable by the user.

Radio signal monitor 330 may include one or more components that determine a maximum data rate based on radio signal conditions experienced by user equipment 110-1. For example, user equipment 110-1 (e.g., a radio module within user equipment 110-1) may determine the maximum data rate (or throughput) that is possible for user equipment 110-1, based on observed or measured radio signal conditions, such as the signal to noise ratio (SiNR) experienced by user equipment 110-1, the interference level experienced by user equipment 110-1, the blur level experienced by user equipment 110-1, the multiple input, multiple output (MIMO) implementation being used for data transmissions, etc. Alternatively, user equipment 110-1 may receive the maximum data rate from another device.

In addition, radio signal monitor 330 may include one or more components that receive the round trip time from RTT monitor 310 and use the round trip time and maximum data rate to determine a TCP window size value. For example, radio signal monitor 330 may determine a TCP window size value as follows:

$$W2=D2*\mathrm{RTT}/m2, \quad (3)$$

where W2 may correspond to the TCP window size value, D2 may correspond to the maximum data rate, RTT may correspond to the monitored round trip time, and m2 may correspond to a multiplier that is observed and measured in high speed wireless networks for window scaling. Like the value of m1, the value for m2 may be hardcoded into user equipment 110-1 and/or may be calculated (or tuned) by user equipment 110-1 or another device. In one implementation, the value for m2 may correspond to the value of m1 or the value may be separately determined or set. Regardless of the value of m2, user equipment 110-1 may adjust the m2 value based on network conditions. Radio signal monitor 330 may recalculate the TCP window size value (W2) at periodic intervals (e.g., at the expiration of a timer). The duration of the interval may correspond to the duration of the interval used for the calculation of the TCP window size value (W2). The duration of the interval may be configurable by the user.

Provisioned data rate module 340 may include one or more components that determine a provisioned data rate for user equipment 110-1. For example, a maximum average data rate may be provisioned to user equipment 110-1 as part of a user's subscription service. When user equipment 110-1 attaches to network 100, eNodeB 120 may report the provisioned maximum average data rate to user equipment 110-1 as part, for example, of an attach procedure. Provisioned data rate module 340 may receive this report and parse this report to identify the provisioned maximum average data rate. Provisioned data rate module 340 may obtain the provisioned maximum average data rate in other ways.

In addition, provisioned data rate module 340 may include one or more components that receive the round trip time from RTT monitor 310 and use the round trip time and provisioned maximum average data rate to determine a TCP window size value. For example, provisioned data rate module 340 may determine a TCP window size value as follows:

$$W3=D3*\mathrm{RTT}/m3, \quad (4)$$

where W3 may correspond to the TCP window size value, D3 may correspond to the provisioned maximum average data rate, RTT may correspond to the monitored round trip time, and m3 may correspond to a multiplier that is observed and measured in high speed wireless networks for window scaling. Like the values of m1 and m2, the value for m3 may be hardcoded into user equipment 110-1 and/or may be calculated (or tuned) by user equipment 110-1 or another device. In one implementation, the value for m3 may correspond to the values of m1 and m2 or the value may be separately determined or set. Regardless of the value of m3, user equipment 110-1 may adjust the m3 value based on network conditions. Provisioned data rate module 340 may recalculate the TCP window size value (W3) at periodic intervals (e.g., at the expiration of a timer). In one implementation, the duration of the interval may be larger than the duration of the intervals used to calculate the TCP window size values (W1) and (W2). The duration of the interval may be configurable by the user.

TCP optimizer 350 may include one or more components that determine an optimized TCP window size value for user equipment 110-1. In one implementation, TCP optimizer 350 may receive the TCP window size value from actual data rate monitor 320, the TCP window size value from radio signal monitor 330, and the TCP window size value from provisioned data rate module 340 and may, based on these TCP window size values, determine an optimized TCP window size value. For example, TCP optimizer 350 may determine the optimized TCP window size value as follows:

$$W\mathrm{opt}=\mathrm{Min}(W1,W2,W3) \quad (5)$$

where Wopt may correspond to the optimized TCP window size value, W1 may correspond to the TCP window size value from actual data rate monitor 320, W2 may correspond to the TCP window size value from radio signal monitor 330, and W3 may correspond to the TCP window size value from provisioned data rate module 340. Here, "Min" refers to the minimum function, which returns the minimum value of its parameters. In one implementation, TCP optimizer 350 may recalculate the optimized TCP window size value each time the W1 and W2 values are received from actual data rate monitor 320 and radio signal monitor 330, respectively.

TCP module 360 may include one or more components that receive the optimized TCP window size value from TCP optimizer 350 and use this value to transmit data to network 100. For example, user equipment 110-1 may utilize the TCP window size value to determine the TCP window size with which data is transmitted from user equipment 110-1.

When user equipment 110-1 corresponds, for example, to a laptop with an external wireless modem, TCP module 360 may be implemented by the operating system of the laptop. TCP optimizer 350 may act as a middleware between the laptop's external wireless modem and TCP module 360, where TCP optimizer 350 may continuously provide the optimized TCP window size value to TCP module 360 to be used for data transmission. When user equipment 110-1 corresponds, for example, to a smart phone, a mobile phone, or a laptop with an internal wireless modem, TCP optimizer 350 may be implemented as part of the TCP implementation, continuously providing window size feedback to TCP module 360.

Although FIG. 3 shows exemplary functional components of user equipment 110-1, in other implementations, user equipment 110-1 may include fewer functional components, different functional components, differently arranged functional components, or additional functional components than depicted in FIG. 3. Additionally or alternatively, one or more functional components of user equipment 110-1 may perform one or more other tasks described as being performed by one or more other functional components of user equipment 110-1.

Figure 4:
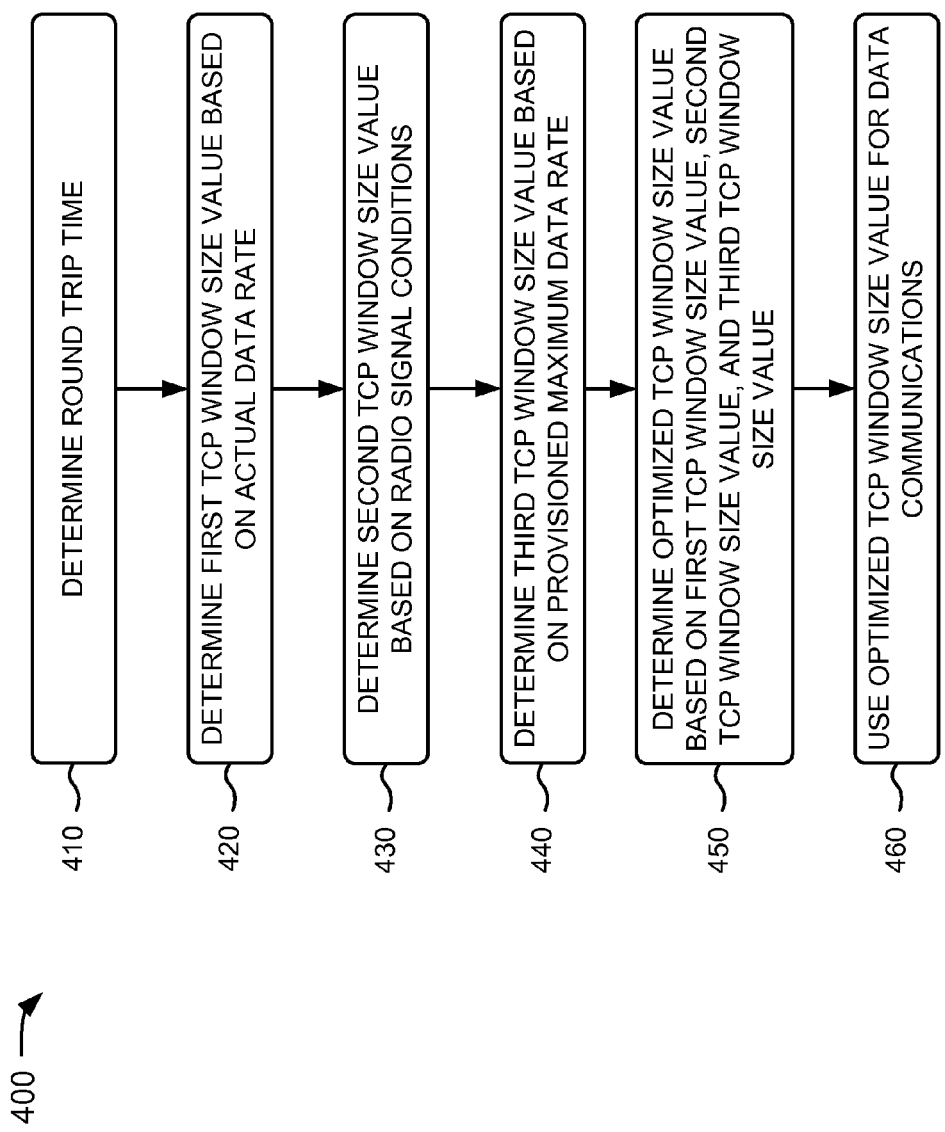

FIG. 4 is a flow chart of an example process 400 for using an optimized TCP window size value for transmitting data. Process 400 may be performed by user equipment 110. In another implementation, some or all of the processing described in FIG. 4 may be performed by one or more devices separate from or in combination with user equipment 110. Process 400 may be performed for each communication session established by user equipment 110.

Process 400 may include determining a round trip time (block 410). For example, user equipment 110 (e.g., RTT monitor 310) may determine a current round trip time by determining the length of time it takes from when a packet is sent from user equipment 110 until an acknowledgement for the packet is received by user equipment 110 from the destination device (e.g., application server 170) corresponding to the communication session. The measured amount of time may correspond to the round trip time. In one implementation, the round trip time may be periodically determined. In some implementations, the value for the RTT may be determined as an average value of a number of RTT measurements.

Process 400 may further include determining a first TCP window size value based on an actual data rate of the user equipment or for the particular communication session (block 420). In one implementation, user equipment 110 (e.g., actual data rate monitor 320) may determine an average data rate of user equipment 110 and use this average data rate to calculate a TCP window size value.

Figure 5:
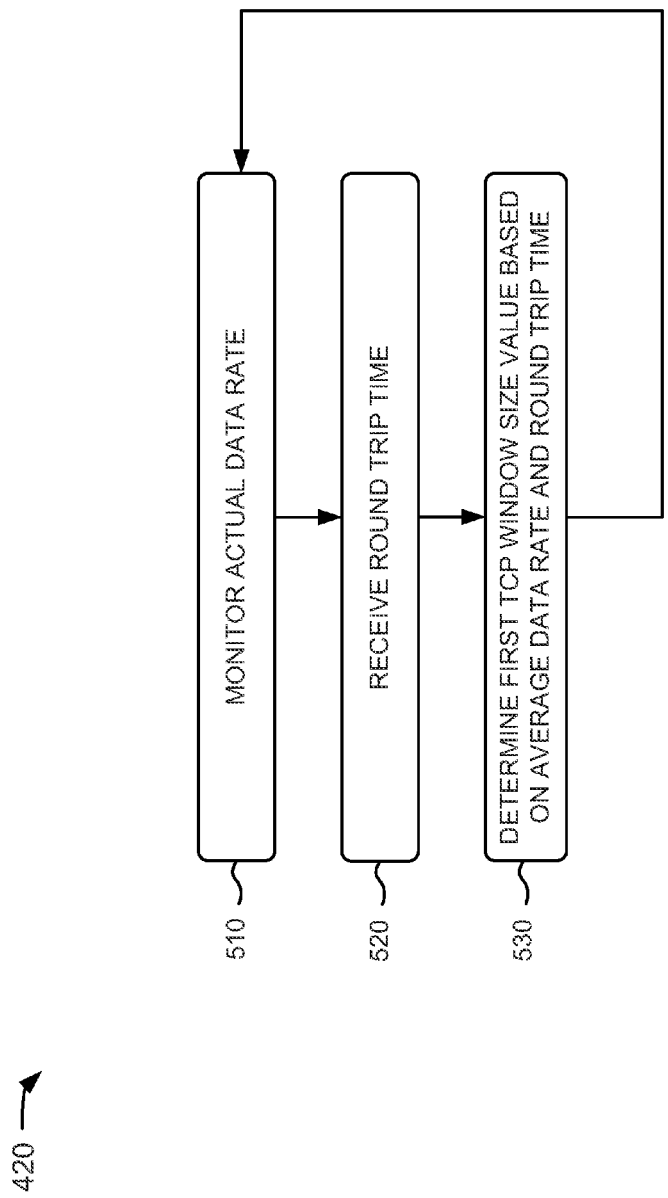

FIG. 5 provides additional details regarding the acts performed by user equipment 110 in relation to block 420. As shown, block 420 may include monitoring an actual data rate of the user equipment (block 510). For example, user equipment 110 (e.g., actual data rate monitor 320) may monitor actual received data for each time period (T) of a certain number (N1) of time periods. Actual data rate monitor 320 may determine a data rate (d) for each time period of the N1 number of time periods and determine an average data rate over all N1 number of time periods. For example, actual data rate monitor 320 may determine an average data rate (D1) as set forth above with respect to equation (1) (e.g., D=(d1+d2+ ... +DN1)/N1, where D1 may correspond to the average data rate, d may correspond to the determined data rate for a time period, and N1 may correspond to the number of time periods). Actual data rate monitor 320 may alternatively determine the average data rate in other ways.

Block 420 may further include receiving a round trip time (block 520). For example, actual data rate monitor 320 may receive the round trip time (as determined in block 410, FIG. 4) from RTT monitor 310. In one implementation, RTT monitor 310 may provide the round trip time to actual data rate monitor 320 in response to a request for the round trip time from actual data rate monitor 320. Alternatively, RTT monitor 310 may automatically provide a round trip time to actual data rate monitor 320 in response to another event, such as in response to RTT monitor 310 making a new round trip time determination.

Block 420 may also include determining a first TCP window size value based on the average data rate and the round trip time (block 530). For example, user equipment 110 (e.g., actual data rate monitor 320) may determine a first TCP window size value as set forth above with respect to equation (2) (e.g., $W1=D1*RTT/m1$, where W1 may correspond to the first TCP window size value, D1 may correspond to the average data rate calculated above with respect to equation (1), RTT may correspond to the monitored round trip time, and m1 may correspond to a multiplier that is observed and measured in high speed wireless networks for window scaling). Actual data rate monitor 320 may, alternatively, calculate the first TCP window size value in other ways. Actual data rate monitor 320 may recalculate the first TCP window size value at periodic intervals (e.g., at the expiration of a timer).

Returning to FIG. 4, process 400 may further include determining a second TCP window size value based on radio signal conditions associated with the user equipment (block 430). In one implementation, user equipment 110 (e.g., radio signal monitor 330) may determine a maximum data rate of user equipment 110, based on the radio signal conditions experienced by user equipment 110, and use this maximum data rate to calculate a second TCP window size value.

Figure 6:
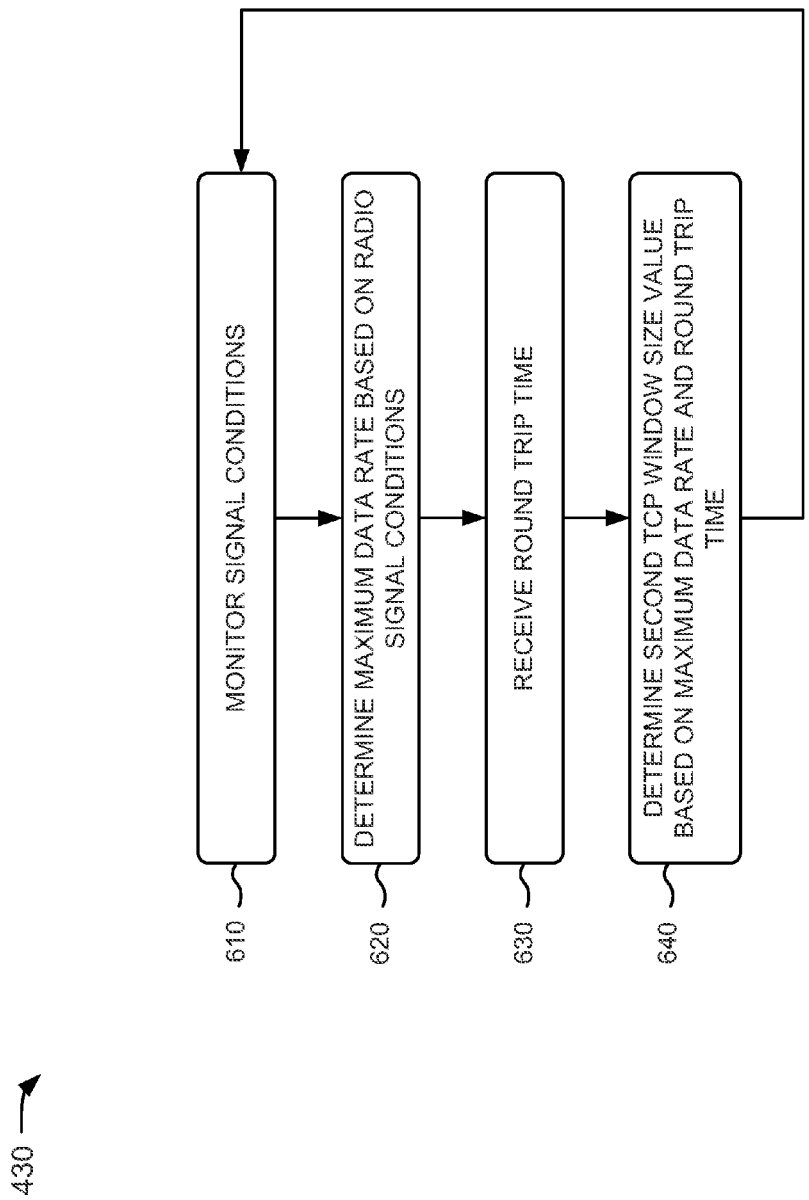

FIG. 6 provides additional details regarding the acts performed by user equipment 110 in relation to block 430. As shown, block 430 may include monitoring signal conditions associated with the user equipment (block 610). For example, user equipment 110 (e.g., radio signal monitor 330) may monitor various signal conditions, including, for example, the signal to noise ratio (SiNR) experienced by user equipment 110, the interference experienced by user equipment 110, the blur experienced by user equipment 110, the MIMO implementation being used for data transmissions, and/or other types of signal conditions. Alternatively, radio signal monitor 330 may receive, from another device (e.g., such as eNodeB 120 or another device), information reflecting the signal conditions associated with user equipment 110.

Block 430 may further include determining a maximum data rate of the user equipment based on the monitored signal conditions (block 620). For example, user equipment 110 (e.g., radio signal monitor 330) may determine the maximum data rate (or throughput) that is possible for user equipment 110, based on monitored signal conditions. Thus, if signal conditions associated with user equipment 110 are very good, user equipment 110 may identify a higher maximum data rate than when signal conditions are not as good.

Block 430 may also include receiving a round trip time (block 630). For example, radio signal monitor 330 may receive the round trip time (as determined in block 410, FIG. 4) from RTT monitor 310. In one implementation, RTT monitor 310 may provide the round trip time to radio signal monitor 330 in response to a request for the round trip time from radio signal monitor 330. Alternatively, RTT monitor 310 may automatically provide a round trip time to radio signal monitor 330 in response to another event, such as in response to RTT monitor 310 making a new round trip time determination.

Block 430 may also include determining a second TCP window size value based on the maximum data rate and the round trip time (block 640). For example, user equipment 110 (e.g., radio signal monitor 330) may determine a second TCP window size value as set forth above with respect to equation (3) (e.g., $W2=D2*RTT/m2$, where W2 may correspond to the second TCP window size value, D2 may correspond to the maximum data rate, RTT may correspond to the monitored round trip time, and m2 may correspond to a multiplier that is observed and measured in high speed wireless networks for window scaling). Radio signal monitor 330 may, alternatively, calculate the second TCP window size value in other ways. Radio signal monitor 330 may recalculate the second TCP window size value at periodic intervals (e.g., at the expiration of a timer).

Returning to FIG. 4, process 400 may also include determining a third TCP window size value based on a maximum data rate at which the user equipment is provisioned (block 440). In one implementation, user equipment 110 (e.g., provisioned data rate module 340) may identify a maximum data rate at which user equipment 110 is provisioned and use this provisioned maximum data rate to calculate a third TCP window size value.

FIG. 7 provides additional details regarding the acts performed by user equipment 110 in relation to block 440. As shown, block 440 may include receiving a provisioned maximum data rate (block 710). For example, user equipment 110 (e.g., provisioned data rate module 340) may receive a provisioned maximum data rate. As described above, a user may subscribe to a service with network 100 and, as a result, a maximum average data rate may be provisioned to user equipment 110 as part of a user's subscription service. In one implementation, when user equipment 110 attaches to network 100, eNodeB 120 may report the provisioned maximum average data rate to user equipment 110 as part, for example, of an attach procedure. Provisioned data rate module 340 may receive this report and parse this report to identify the provisioned maximum average data rate. Provisioned data rate module 340 may, alternatively, obtain the provisioned maximum average data rate in other ways.

Block 440 may further include receiving a round trip time (block 720). For example, provisioned data rate module 340 may receive the round trip time (as determined in block 410, FIG. 4) from RTT monitor 310. In one implementation, RTT monitor 310 may provide the round trip time to provisioned data rate module 340 in response to a request for the round trip time from provisioned data rate module 340. Alternatively, RTT monitor 310 may automatically provide a round trip time to provisioned data rate module 340 in response to another event, such as in response to RTT monitor 310 making a new round trip time determination.

Block 440 may also include determining a third TCP window size value based on the provisioned maximum data rate and the round trip time (block 730). For example, user equipment 110 (e.g., provisioned data rate module 340) may determine a third TCP window size value as set forth above with respect to equation (4) (e.g., W3=D3*RTT/m3, where W3 may correspond to the third TCP window size value, D3 may correspond to the provisioned maximum average data rate, RTT may correspond to the monitored round trip time, and m3 may correspond to a multiplier that is observed and measured in high speed wireless networks for window scaling). Provisioned data rate module 340 may, alternatively, calculate the third TCP window size value in other ways. Provisioned data rate module 340 may recalculate the third TCP window size value at periodic intervals (e.g., at the expiration of a timer).

Returning to FIG. 4, process 400 may include determining an optimized TCP window size value based on the first TCP window size value, the second TCP window size value, and the third TCP window size value (block 450). For example, user equipment 110 (e.g., TCP optimizer 350) may receive the first TCP window size value from actual data rate monitor 320, the second TCP window size value from radio signal monitor 330, and the third TCP window size value from provisioned data rate module 340 and may, based on these TCP window size values, determine an optimized TCP window size value. For example, TCP optimizer 350 may determine the optimized TCP window size value as set forth above with respect to equation (5) (e.g., Wopt=Min(W1, W2, W3), where Wopt may correspond to the optimized TCP window size value, W1 may correspond to the first TCP window size value, W2 may correspond to the second TCP window size value, and W3 may correspond to the third TCP window size value). TCP optimizer 350 may, alternatively, calculate the optimized TCP window size value in other ways. TCP optimizer 350 may recalculate the optimized TCP window size value at periodic intervals (e.g., at the expiration of a timer, as new TCP window values are received from actual data rate monitor 320, radio signal monitor 330, and provisioned data rate module 340, and/or at other times).

Process 400 may further include using the optimized TCP window size value for data communications (block 460). For example, user equipment 110 may transmit the optimized TCP window size value to application server 170. The optimized TCP window size may then be used for communications between user equipment 110 and application server 170. For example, communication interface 220 may use the optimized TCP window size in a TCP-based communication session with application server 170.

In one possible implementation, user equipment 110 may use the optimized TCP window size value in the Window Size field of the TCP/IP segment header.

In another implementation, user equipment 110 may selectively transmit the optimized TCP window size value to application server 170. For example, user equipment 110 may compare the newly calculated optimized TCP window size value to the previously calculated optimized TCP window size value. If the newly calculated optimized TCP window size value does not vary from the previously calculated optimized TCP window size value by more than a threshold, then user device 110 may simply do nothing. If, on the other hand, the newly calculated optimized TCP window size value varies from the previously calculated optimized TCP window size value by more than a threshold, then user device 110 may transmit the newly calculated TCP window size vain of application server 170 as part of the TCP protocol.

The foregoing description provides illustration and description, but is not intended to be exhaustive or to limit the invention to the precise form disclosed. Modifications and variations are possible in light of the above teachings or may be acquired from practice of the invention. For example, while the description above focuses on a 4G system, it will be appreciated that implementations described herein are equally applicable to other types of systems, such as, for example, a Worldwide Interoperability for Microwave Access (WiMAX) system.

While series of blocks have been described with regard to FIGS. 4-7, the order of the blocks may be modified in other implementations. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component or module that performs one or more functions. A component or a module, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A user equipment comprising:
a memory to store instructions; and
a processor to execute the instructions to:
   calculate a Transmission Control Protocol (TCP) window size based on a smallest window size value selected from:
      a first TCP window size value based on an actual data rate, of received data, determined for the user equipment,
      a second TCP window size value based on a maximum possible data rate, of the user equipment, identified for a current set of observed signal conditions associated with the user equipment, and
      a third TCP window size value based on a provisioned data rate corresponding to a subscription service associated with the user equipment, and
   communicate with a destination device, over a wireless network, using the calculated TCP window size in a TCP session.

2. The user equipment of claim 1, wherein, when determining the first TCP window size value, the processor is further configured to execute the instructions to:
   monitor a received actual data rate for each time period of a plurality of time periods,
   determine an average actual data rate over the plurality of time periods,
   receive a round trip time associated with the user equipment and the destination device, and
   calculate the first TCP window size value based on the average received data rate and the round trip time.

3. The user equipment of claim 1, wherein, when determining the second TCP window size value, the processor is further configured to execute the instructions to:
   identify the maximum possible data rate based on the current set of observed signal conditions associated with the user equipment,
   receive a round trip time associated with the user equipment and the destination device, and
   calculate the second TCP window size based on the identified maximum possible data rate and the round trip time.

4. The user equipment of claim 3, wherein the observed signal conditions include information relating to one or more of a signal to noise ratio, an interference level, a blur level, or a multiple input, multiple output implementation used for communications.

5. The user equipment of claim 1, wherein, when determining the third TCP window size value, the processor is further configured to execute the instructions to:
   obtain a report associated with an attach operation performed with respect to the wireless network,
   parse the report to identify a data rate at which the user equipment is provisioned,
   receive a round trip time associated with the user equipment and the destination device, and
   calculate the third TCP window size based on the provisioned data rate and the round trip time.

6. The user equipment of claim 1, wherein the processor is further configured to execute the instructions to:
   determine a round trip time for the user equipment in communicating with the destination device, and
   wherein, when calculating the TCP window size, the processor is further configured to execute the instructions to:
   calculate the TCP window size further based on the determined round trip time.

7. The user equipment of claim 1, wherein the processor is further configured to execute the instructions to:
   repeat, at an interval, the calculating the TCP window size to obtain a new TCP window size, value,
   compare the TCP window size and the new TCP window size to determine a difference, and
   cause data to be transmitted from the user equipment based on the new TCP window size when the difference exceeds a threshold value.

8. A method comprising:
   determining, by a user equipment, a first window size value based on first information with respect to data received, at the user equipment, in communicating to a destination device via a wireless network;
   determining, by the user equipment, a second window size value based on second information with respect to a set of measured signal conditions corresponding to the communicating;
   determining, by the user equipment, a third window size value based on third information with respect to a subscribed data rate corresponding to the communicating, wherein the first window size value, the second window size value, and the third window size value are different;
   determining, by the user equipment, a fourth window size value based on a smallest window size value selected from the first window size value, the second window size value, and the third window size value; and
   transmitting, by the user equipment and to the wireless network, data using the fourth window size value as a Transmission Control Protocol (TCP) window size in a TCP communication session with the destination device.

9. The method of claim 8, where the first information includes an average data rate received by the user equipment over a plurality of time periods and a round trip time between the user equipment and the destination device.

10. The method of claim 9, wherein the second information includes a possible data rate of the user equipment based on the measured signal conditions and the round trip time.

11. The method of claim 10, where the third information includes the subscribed data rate at which the user equipment has been provisioned and the round trip time.

12. A system comprising:
one or more processor devices configured to:
- determine a plurality of first Transmission Control Protocol (TCP) window size values relating to communications via a wireless network, including:
  - at least one TCP window size value, of the plurality of first TCP window size values, based on an actual data rate obtained by the system,
  - at least another TCP window size value, of the plurality of first TCP window size values, based on a possible data rate associated with the system, and
  - at least one other TCP window size value, of the plurality of first TCP window size values, based on a subscribed data rate at which the system has been provisioned, and
- determine a second TCP window size value based on a selection of a smallest value of the plurality of first TCP window size values, and
- transmit data using a transmission window size corresponding to the second TCP window size value.

13. The system of claim 12, wherein, when determining the at least one TCP window size value, the one or more processor devices are further configured to:
- monitor a received actual data rate for each time period of a plurality of time periods,
- determine an average actual data rate over the plurality of time periods,
- receive a round trip time associated with the system, and
- calculate the at least one TCP window size value based on the average received data rate and the round trip time.

14. The system of claim 12, wherein, when determining the at least another TCP window size value, the one or more processor devices are further configured to:
- identify the possible data rate based on a current set of signal conditions associated with the system,
- receive a round trip time associated with the system, and
- calculate the at least another TCP window size based on the identified possible data rate and the round trip time.

15. The system of claim 12, wherein, when determining the at least one other TCP window size value, the one or more processor devices are further configured to:
- obtain a report associated with an attach operation performed with respect to the wireless network,
- parse the report to identify the subscribed data rate at which the system is provisioned,
- receive a round trip time associated with the system, and
- calculate the at least one other TCP window size based on the provisioned subscribed data rate and the round trip time.

* * * * *